United States Patent [19]

Chen et al.

[11] Patent Number: 5,232,966

[45] Date of Patent: Aug. 3, 1993

[54] METHOD OF IMPROVING THE PRINTING OF POLYOLEFINS WITH WATER-BASED INKS

[76] Inventors: Bing-Lin Chen; James A. Barker, both of Witco Corp. 1272 Warford St., Memphis, Tenn. 38108

[21] Appl. No.: 831,955

[22] Filed: Feb. 6, 1992

[51] Int. Cl.⁵ .............................................. C08K 5/20
[52] U.S. Cl. ..................................... 524/224; 524/232; 524/449; 524/451; 524/448; 524/427
[58] Field of Search ............... 524/224, 232, 427, 428, 524/448, 449, 451

[56] References Cited

U.S. PATENT DOCUMENTS

| | | | |
|---|---|---|---|
| 2,956,979 | 10/1960 | Rowland et al. | 524/224 |
| 3,326,840 | 6/1967 | Ross et al. | 524/224 |
| 3,396,137 | 8/1968 | Wharton | 524/224 |
| 3,647,738 | 3/1972 | Foster | 524/224 |

Primary Examiner—Joseph L. Schofer
Assistant Examiner—Peter Mulcahy

[57] ABSTRACT

A method for improving the printing of polyolefins with water-based inks by incorporating into the polyolefin an effective amount of N-ethanol erucamide or N-ethanol oleamide. Optionally a finely divided inorganic material can be added with the N-ethanol erucamide or N-ethanol oleamide.

9 Claims, No Drawings

METHOD OF IMPROVING THE PRINTING OF POLYOLEFINS WITH WATER-BASED INKS

BACKGROUND

This invention relates to improving the adhesion of water-based inks to polyolefin polymers. In particular this invention is directed to improving the printing of polyolefin films with water-based inks. An important aspect of the present invention is the improved adhesion of water-based inks to polyolefin films containing N-ethanol erucamide and/or N-ethanol oleamide.

Olefin homopolymers and copolymers are of commercial importance for the manufacturer of numerous articles such as films and other items. In order to be useful for many of these functions it is desirable that the polyolefinic composition have good slip characteristics. This can be determined by measuring the coefficient of friction of the polyolefin. It is of increasing importance that the polyolefinic composition have excellent adhesion to water-based inks.

In order to obtain a satisfactorily low coefficient of friction, often slip agents are added to the polyolefin to lower its coefficient of friction below about 0.5, preferably below 0.3. Many slip agents and other additives for polyolefins are disclosed in the literature. These additives will lower the coefficient of friction of the polyolefin to desired levels, permitting ready handling of shaped articles and films prepared from the polyolefinic material. Polyolefinic polymers having poor slip characteristics are difficult to handle when the polymer is manufactured in the customary manner of large rolls. During storage and subsequent processing, the low slip films tend to adhere layer to layer. Also such films can encounter large frictional forces in processing equipment that often cause distortions and even tearing of the film, especially when using thin film.

Rowland et al U.S. Pat. No. 2,956,979 discloses inhibiting the blocking tendencies of polyethylene by introducing into the composition a small amount of an alkylol amide of the structural formula:

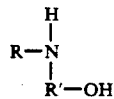

wherein R is a saturated aliphatic acyl radical of from about 18 to about 30 carbon atoms and R' is an alkyl radical group of 1 to 6 carbon atoms. Toy et al U.S. Pat. No. 3,028,355 discloses the use of diatomaceous earth to reduce the tendency of polyethylene to block. Haeske et al U.S. Pat. No. 3,266,924 discloses the blending of a mixture of finely divided siliceous material and a fatty acid amide slip agent into polyethylene to enhance its slip and blocking properties. Ross et al U.S. Pat. No. 3,326,840 discloses the incorporation of a small amount of a mono-N-substituted saturated carboxylic acid amide of the formula:

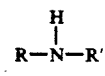

wherein R is an aliphatic acyl radical having from 12 to 30 carbon atoms and R' is an aliphatic group having from 1 to 6 carbon atoms, especially an alkylol group, into a copolymer of ethylene and an aliphatic ethylenically unsaturated carboxylic ester to improve its resistance to blocking and improve its slip properties.

Foster U.S. Pat. No. 3,647,738 discloses blending an amide having the formula:

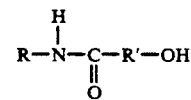

wherein R is an alkenyl radical having 18 to about 22 carbon atoms and R' is a divalent hydrocarbon radical containing 3 to 15 carbon atoms with an alpha-olefin polymer composition to provide compositions having low blocking and no bloom characteristics and high slip properties.

Wharton U.S. Pat. No. 3,396,137 discloses compositions comprising an ethylene polymer and an N-substituted unsaturated carboxylic amide having improved properties with respect to the coefficient of friction and the adhesion of solvent-based printing inks to the surface of the polymer.

While the foregoing patents and other literature disclose a variety of additives that improve the slip and/or blocking properties of polyolefins, they are silent on improving the adhesion of water based inks to said polyolefins. It is necessary that the polyolefinic compositions containing the slip and blocking agents have excellent ink adhesion, particularly to water based inks and good printability so that the molded article, film or other item made from the polymer can be suitably printed. Of late it has become highly desirable for environmental reasons, such as to reduce emissions of volatile organic compounds, that the inks used to print on the polyethylene composition be water-based inks.

Accordingly it is an object of the present invention to improve the slip properties of polyolefinic compositions and simultaneously improve the ink adhesion properties, particularly the adhesion of water-based inks.

It is another object of the present invention to improve the printability of water-based inks on polyolefinic compositions, particularly on films and bags used as packaging material.

Another object of the present invention is to impart the desired slip, printability and adhesion to water-based inks to polyolefin compositions without adversely affecting the optical properties of the polyolefin.

Other objects of the present invention will become apparent from the ensuing description.

SUMMARY OF THE INVENTION

The method of the present invention comprises incorporating an effective amount of specified N-ethanol acid amides into a polyolefin polymer forming a polyolefin composition having improved adhesion of inks, particularly water-based inks.

The ethanol amides particularly useful in the present invention are N-ethanol erucamide and/or N-ethanol oleamide. Optionally, an effective amount of a finely divided inorganic material can also be incorporated into the polyolefin with the N-ethanol erucamide or N-ethanol oleamide.

DETAILED DESCRIPTION OF THE INVENTION

The present invention provides for polyolefins having improved adhesion to inks, particularly water-based inks. The polyolefins can be homopolymers and copolymers and mixtures thereof.

Among the polyolefins of this description are ethylene and propylene homopolymers and copolymers. Polyethylene can be low density and high density polymeric material. Linear low density polyethylene is in general a copolymer of ethylene and up to about 10 weight percent of a second olefin, such as propylene, butene, hexene or octene. High density polyethylene is normally a homopolymer.

There are, basically, two types of olefin polymerization techniques for preparing high molecular weight olefin polymers and copolymers. The oldest commercial technique involves high pressure, high temperature, and the use of a free radical initiator, such as peroxide; these type polymers are generally known as low density polyethylene (LDPE). These LDPE polymers contain branched chains of polymerized monomer units pendant from the main polymer "backbone" and generally have densities in the range of about 0.910–0.935 gms/cc.

The other commercially-used technique involves coordination catalysts of the "Ziegler" type or "Phillips" type and includes variations of the Ziegler type, such as the Natta type. These catalysts may be used at very high pressures, but are generally used at very low or intermediate pressures. The products made by these coordination catalysts are generally known as "linear" polymers because of the substantial absence of branched chains of polymerized monomer units pendant from the main polymer "backbone," and they are also generally known as high density polyethylene (HDPE). Linear polyethylene (HDPE) ordinarily has a density in the range of 0.941 to 0.965 gms/cc.

Also used in the present invention are "linear" type ethylene polymers wherein ethylene has been polymerized along with minor amounts of alpha, beta, ethylenically unsaturated alkenes having from 3 to 12 carbons per alkene molecule, preferably 4 to 8. The amount of the alkene comonomer is generally sufficient to cause the density of the polymer to be substantially in the same density range as LDPE, due to the alkyl side chains on the polymer molecule, yet the polymer remains in the "linear" classification; they are conveniently referred to as "linear" low density polyethylene" (LLDPE). These polymers retain much of the strength, crystallinity, and toughness normally found in HDPE homopolymers of ethylene, but the highest alkene comonomers impart high "block" characteristics to extrusion-cast films and the high "slip" (i.e. low coefficient of friction) characteristic inherently found in HDPE is diminished.

Other homopolymers which can be used include: polypropylene, polybutene-1, poly(4-methylpentene-1) and the like.

Exemplary of the copolymers of olefinically unsaturated aliphatic hydrocarbons which are preferred are ethylene-propylene copolymers, containing about 1 to about 99% by weight, based on the total copolymer, of propylene copolymerized therein, ethylene-butene-1 copolymers containing about 1 to about 99%, based on the total copolymer of butene-1 copolymerized therein, ethylenehexene-1 copolymers containing about 1 to about 99% by weight based on the total copolymer of hexene-1 copolymerized therein and the like.

The homopolymers and copolymers of olefinically unsaturated aliphatic hydrocarbons referred to above can be made by either free radical catalyzed high pressure techniques or anionic catalyzed low pressure techniques known in the art and described in "Crystalline Olefin Polymers" Part I by R. A. V. Raff and K. W. Doak, Interscience Publishers, NYC 1965 which is incorporated herein by reference.

The ethylene-acrylic acid interpolymers ethylenemethacrylic acid interpolymers, ethylene-vinyl acetate interpolymers and ethylene-alkyl acrylate methacrylate interpolymers of this invention can be made by the free radical, random interpolymerization of ethylene with the corresponding comonomer using methods well known in the art including bulk, solution, aqueous suspension, non-aqueous dispersion and emulsion techniques in either batch or continuous process.

There are numerous polyolefin resins useful in the present invention. For example, Rexene ® high molecular weight, low density polyethylene resins made by the polymerization of ethylene using a free radical initiator at high pressure and high temperature was used in the experimental work reported in Examples 1–5. These polyethylene resins have the following properties:

Density 0.921 grams/cc
Melt Index 1.0 grams/10 minutes
Tensile (yield) 1500 psi
Tensile (at break) 2100 psi
Ultimate Elongation 500%
Secant Modulus 50,000 psi
Hardness 48 Shore D
Softening Point (Vicant) 200° F.

Among other polyolefins useful in the present invention are ethylene-vinyl acetate copolymer resins such as Rexene ® PE 1335 which has a density of 0.924 grams/cc; a melt index of 2.0 grams/10 minutes and a vinyl acetate content of 3.3%; linear low density polyethylene resins such as Dowlex 4047 of Dow Chemical Co. which has a density of 0.917 grams/cc and a melt index of 2.3 grams/10 minutes and polypropylene, such as Petrothene ® PP 8000-GK of Quantum Chemical Co. which has a density between about 0.89–0.91 grams/cc and a melt index of 5.0 grams/10 minutes. These materials are merely representative of polyolefins useful in the present invention which are numerous and can be selected depending upon the desired properties of the final composition.

Various additives are often incorporated into the polyolefin. One such group of additives are antioxidants such as hindered phenols, phenolic phosphites, secondary arylamines and the like. These antioxidants are used in quantities between about 0.01 to about 1 weight percent of the polymer. Other additives such as colorants, antiblocking agents, antistatic agents and lubricants are commonly used. Also lubricants are often incorporated into polyolefin compositions, particularly polypropylene and high density po'yethylene in order to improve the processability of the polymer.

As previously indicated, there are many materials known to improve slip and blocking properties of films. In recent years environmental concerns have arisen as to the use of organic solvents. Thus, it has become desirable to use water-based inks. The solvent-based inks previously used are often considered to be environmentally undesirable. The materials previously used as slip and antiblocking agents such as unsubstituted amides of long-chain fatty acids, particularly erucamide, do not provide the polyolefinic polymer with the desired adhesion to water-based inks. This property is provided by the present method.

In general the incorporation of from about 0.05 to about 0.3 weight percent of the identified N-ethanol acid amides into the polyolefin composition will provide good adhesion of water-based inks. Larger amounts of the N-ethanol acid amide can be used in many instances without significant changes in the water based ink adhesion properties of the composition. In certain instances it is preferred that there is used from about 0.05 to about 0.2 weight percent of the N-ethanol acid amide.

Optionally, the method of the present invention may in addition to the N-ethanol acid amides add other components which further the improvement of the adhesion of the water-based inks to the polyolefin polymer. For example, it has been found that the addition of a finely divided inorganic material can enhance the adhesion to water-based inks of the polyolefin compositions of the present invention. In general the presence of from about 0.05 to about 1.0, preferably from about 0.1 to about 0.5, weight percent of the finely divided inorganic material in the polyolefin composition will be of value in improving the water based ink adhesion of the polyolefin polymers. Examples of these finely divided materials are silica, mica, talc, diatomaceous earth and calcium carbonate.

The method of the present invention can be performed by admixing the polyolefin polymer and the N-ethanol acid amides by various methods.

One method is to blend a masterbatch of the polyolefin polymer containing the N-ethanol acid amide and other additives. This can be accomplished by grinding polyolefin pellets in a mill to form a coarse granule. The N-ethanol acid amide and other additives are melted onto the surface of the polyolefin granules with the use of a heat lamp. Then the granules are mixed and the mixture is extruded through a capillary die to form a strand which is pelletized. If desired, the pelletizing procedure can be repeated as many times as desired so as to insure adequate mixing of the components.

The masterbatch can then be added to virgin polyolefin polymer by shaking and tumbling the masterbatch and polyolefin pellets. Then the mixture can be converted into the desired product by extrusion, blow molding, blow extrusion, compression molding or other commercial method.

When an extrusion is desired, the mixture can be extruded through a two-stage mixing screw with a 3:1 compression ratio and a 20:1 length:diameter ratio, although other equipment can be used. The temperature of the barrel and die are controlled. As the molten plastic tube emerges from the die it can be blown with air to the predetermined diameter and cooled with air.

Also the method of the present invention can be performed by casting a film by extrusion through a slot die using a simple screw extruder having characteristics such as those for the aforedescribed two-stage mixing screw. Similar test results are obtained from cast films as with blown films.

This N-ethanol erucamide of the present invention can be prepared by reacting an ethanolamine and a methyl ester of fatty acids, such as erucic acid or oleic acid. This general preparation of an amide is described in the literature.

In order to demonstrate the usefulness of the present invention in improving the adhesion of water based ink a series of experiments was performed.

Samples of polyolefin polymers (10"×5") were corona treated in two paths for a total of 50 seconds using a high frequency corona treater equipped with a 2 ⅜ inch field effect electrode (Model BD-20C made by Electro-Technic Products, Inc.). The field electrode is held at about 1.5 centimeters from the film surface during the corona treatment. Printability tests are performed on the film one week after the corona treatment. A stripe (10"×2¼") is made on the film with a water-based ink, Hydropoly Red Ink, S89-4710B from Sun Chemical Co. using a spring-loaded handproofer having 2¼ inch printing width. The printed film is dried in an oven at 160° F. for 20 seconds. The appearance of the print is rated good (G), fair (F) or poor (P) with respect to the smoothness of the ink coverage and the presence of visual pinholes.

The adhesion of the ink is evaluated by pulling a piece of Scotch 600 tape off the printed surface to determine how much ink remains on the printed surface. The ink adhesion was determined on a scale from 0 to 10 with a zero representing zero ink adhesion and 10 representing 100% ink adhered to the printed surface. Ink adhesion determination were made on two different product segments and the average reported in the tables.

The coefficient of friction (COF) was determined by ASTM D1894-75 moving sled/stationary plane test method using an Instron 1130 Universal Testing Instrument. Slip measurements were made one week after extrusion on five different film segments and the average reported in the table. A COF greater than 0.5 is considered poor, 0.3 to 0.5 fair and 0.3 or below considered good. It is the good adhesion of water-based inks to polyolefins having the desired good slip that is sought by industry and as demonstrated in the following examples has been found by the present invention.

EXAMPLE 1

Compositions containing N-ethanol erucamide of the present invention incorporated into low density polyethylene resin compositions were extrusion blown to films and their properties compared to low density polyethylene films containing either no additive or control additives. The results as reported below demonstrate the improvement in the adhesion of water-based inks to polyolefin films containing N-ethanol erucamide.

| N-ethanol erucamide (ppm) | Control (ppm) | Microken 801[3] (ppm) | C.O.F. | Ink Adhesion |
| --- | --- | --- | --- | --- |
| 2000 | 0 | 0 | 0.25 | 5.8 |
| 2000 | 0 | 1500 | 0.14 | 7.3 |
| 0 | 0 | 0 | 0.95 | 10.0 |
| 0 | 0 | 1500 | 0 73 | 10.0 |
| 0 | 2000[1] | 0 | 0.20 | 0 |
| 0 | 2000[1] | 1500 | 0.14 | 0 |
| 0 | 2000[2] | 0 | 0.64 | 2.6 |
| 0 | 2000[2] | 1500 | 0.38 | 1.0 |

In all experiments the printability was found to be good.
[1] erucamide
[2] N-ethanol stearamide
[3] Microken 801 is a diatomaceous earth from Witco Co.

EXAMPLE 2

The procedures of Example 1 were repeated incorporating 2000 ppm N-ethanol erucamide along with 1500 ppm each of $CaCO_3$, Microken 801, mica, silica or talc into the low density polyethylene resin compositions with the following results:

| Run | Additive | C.O.F. | Ink Adhesion |
|---|---|---|---|
| 1 | Calcium Carbonate | 0.16 | 4.5 |
| 2 | Microken 801 | 0.14 | 7.3 |
| 3 | Mica | 0.24 | 4.0 |
| 4 | Silica | 0.12 | 4.5 |
| 5 | Talc | 0.15 | 3.5 |

In each experiment the printability was found to be good.

EXAMPLE 3

The procedures of Example 1 were repeated with low density polyethylene films containing either N-ethanol erucamide or erucamide (control) with each sample being subjected to a different corona treatment time to give the following results:

| Run | Additive (ppm) | Corona Treatment Time (Second) | Ink Adhesion |
|---|---|---|---|
| 1 | 2000[1] | 50 | 0 |
| 2 | 2000[1] | 100 | 0.5 |
| 3 | 2000[2] | 50 | 5.8 |
| 4 | 2000[2] | 75 | 9.2 |
| 5 | 1000[2] | 50 | 9.5 |
| 6 | 1000[2] | 100 | 10.0 |

[1] erucamide
[2] N-ethanol erucamide

In each experiment the printability was found to be good.

EXAMPLE 4

Additional experiments in accordance with the procedures of Example 1 were performed with the following results.

| Run | N-Ethanol Erucamide (ppm) | Microken 801 (ppm) | C.O.F. | Ink Adhesion |
|---|---|---|---|---|
| 1 | 500 | 0 | 0.46 | 7.9 |
| 2 | 500 | 1500 | 0.19 | 8.9 |
| 3 | 1000 | 0 | 0.24 | 9.5 |
| 4 | 1000 | 1500 | 0.15 | 9.7 |
| 5 | 2000 | 0 | 0.25 | 5.8 |
| 6 | 2000 | 1500 | 0.15 | 7.3 |
| 7 | 2000 | 10000 | 0.15 | 7.7 |
| 8 | 3000 | 0 | 0.21 | 2.9 |
| 9 | 3000 | 1500 | 0.14 | 4.2 |

In each experiment the printability was found to be good.

EXAMPLE 5

The procedure of Example 1 were repeated using low density polyethylene polymer containing N-ethanol oleamide in accordance with the present invention and with the following results:

| Run | N-Ethanol Oleamide (ppm) | MicroKen 801 (ppm) | C.O.F. | Ink Adhesion |
|---|---|---|---|---|
| 1 | 500 | 0 | 0.38 | 9.8 |
| 2 | 500 | 1500 | 0.22 | 9.6 |
| 3 | 1000 | 0 | 0.25 | 8.1 |
| 4 | 1000 | 1500 | 0.20 | 9.4 |
| 5 | 2000 | 0 | 0.23 | 6.0 |
| 6 | 2000 | 1500 | 0.12 | 5.6 |

In each experiment the printability was fair to good.

EXAMPLE 6

Example 1 was repeated using linear low density polyethylene (LLDPE), polypropylene (PP) and ethylenevinyl acetate copolymer (EVA) with the following results:

| Run | Polymer | N-ethanol Erucamide (ppm) | MicroKen 801 (ppm) | C.O.F. | Ink Adhesion |
|---|---|---|---|---|---|
| 1 | LLDPE | 0 | 0 | >1.0 | 9.0 |
| 2 | LLDPE | 500 | 3000 | 0.37 | 9.1 |
| 3 | LLDPE | 1000 | 3000 | 0.26 | 5.0 |
| 4 | PP | 0 | 0 | 0.77 | 7.3 |
| 5 | PP | 2000 | 3000 | 0.30 | 5.1 |
| 6 | EVA | 0 | 0 | >1.0 | 9.7 |
| 7 | EVA | 1000 | 3000 | 0.23 | 4.3 |

In each experiment, the printability was good.

EXAMPLE 7

The procedure of Example 1 were repeated using low density polyethylene resin and a mixture of N-ethanol acid amides which has a weight percent composition similar to that of rapeseed oil, as follows:

| | |
|---|---|
| N-ethanol erucamide | 46.9 wt. % |
| N-ethanol eicosenamide | 7.4 wt. % |
| N-ethanol linolenamide | 8.7 wt. % |
| N-ethanol linoleamide | 14.0 wt. % |
| N-ethanol oleamide | 14.6 wt. % |
| N-ethanol stearamide | 1.1 wt. % |
| N-ethanol palmitamide | 3.3 wt. % |

The results of this test were as follows:

| Run | Polymer | N-ethanol Acidamide (ppm) | MicroKen 801 (ppm) | C.O.F. | Ink Adhesion |
|---|---|---|---|---|---|
| 1 | LDPE | 1000 | 0 | 0.29 | 9.5 |
| 2 | LDPE | 1000 | 1500 | 0.24 | 9.9 |
| 3 | LDPE | 500 | 0 | 0.38 | 9.9 |
| 4 | LDPE | 500 | 1500 | 0.24 | 9.7 |
| 5 | LLDPE | 0 | 0 | >1.0 | 9.0 |
| 6 | LLDPE | 1000 | 3000 | 0.23 | 5.3 |
| 7 | PP | 0 | 0 | 0.62 | 7.9 |
| 8 | PP | 2000 | 0 | 0.32 | 5.2 |

In each experiment, the printability was good except in Run 6 wherein the printability was fair.

EXAMPLE 8

The procedures of Example 1 were repeated using a 50/50 blend of N-erucyl lactamide and N-ethanol erucamide in low density polyethylene with the following results:

| Run | N-ethanol lactamide (ppm) | N-ethanol erucamide (ppm) | MicroKen 801 (ppm) | C.O.F. | Ink Adhesion |
|---|---|---|---|---|---|
| 1 | 500 | 500 | 1500 | 0.27 | 9.3 |
| 2 | 1000 | 1000 | 1500 | 0.24 | 6.2 |

In each experiment, the printability was good.

EXAMPLE 9

In order to demonstrate the selective advantage of the N-ethanol acid amide of the present invention, the procedures of Example 1 were repeated using other N-alkylol acid amides outside of the scope of the present invention with the following results:

| Run | N-(3-hydroxy propyl)-erucamide (ppm) | N-(4-hydroxy butyl)-erucamide (ppm) | N-(5-hydroxy pentyl)-erucamide | Microken 801 (ppm) | C.O.F. | Ink Adhesion |
|---|---|---|---|---|---|---|
| 1 | 2000 | 0 | 0 | 1500 | 0.18 | 0 |
| 2 | 0 | 2000 | 0 | 1500 | 0.16 | 1.0 |
| 3 | 0 | 0 | 2000 | 1500 | 0.17 | 1.2 |

In each experiment, the printability was good.

It can be seen from the foregoing test data that the incorporation of N-ethanol erucamide and N-ethanol oleamide of the present invention into polyolefin films, especially into low density polyethylene, improves the adhesion of water-based ink to the polyolefin while providing good slip. Furthermore, the N-ethanol acid amide can be used in combination with a finely divided inorganic material with enhanced results. This combination of components enhances the increase in slip and adhesion of water-based inks of the polyolefinic compositions. Included among the finely divided inorganic material useful in the present invention are silica, mica, talc, diatomaceous earth and calcium carbonate generally having a particle size of from 0.1 to about 100 microns. The finely divided inorganic material is generally used in amounts of from about 0.05 to about 1.0, preferably from about 0.1 to about 0.5 weight percent of the weight of the polyolefins polymer. Also the data shows that a prolonged corona discharge treatment will further improve the adhesion of the water-based ink to polyolefins containing the additives of the present invention. Other like treatments can also be used with the methods and compositions of this invention.

It should be understood that the embodiments of the present invention which have been described are merely illustrative of a few of the applications of the principles of the present invention. Numerous modifications may be made by those skilled in the art without departing from the spirit and scope of the invention.

We claim:

1. A method for improving the adhesion of water-based inks to polyolefin polymers which comprises incorporating into the polyolefin polymers an effective amount of an N-ethanol acid amide selected from the group consisting of N-ethanol erucamide and N-ethanol oleamide.

2. The method of claim 1 wherein there is also added to the polyolefin polymer an effective amount of a finely divided inorganic material.

3. The method of claim 2 wherein the finely divided inorganic material is selected from the group consisting of silica, mica, talc, diatomaceous earth and calcium carbonate.

4. The method of claim 1 wherein the polyolefin polymer is a homopolymer or copolymer of ethylene, or a homopolymer or a copolymer of propylene.

5. The method of claim 4 wherein the polyolefin polymer is a low density polyethylene.

6. The method of claim 4 wherein the polyolefin polymer is polypropylene.

7. The method of claim 1 wherein the N-ethanol acid amide is N-ethanol erucamide.

8. The method of claim 1 wherein the N-ethanol acid amide is N-ethanol oleamide.

9. The method of claim 1 wherein the N-ethanol acid amide is between 0.05 and about 0.20 weight percent of the polyolefin polymer.

* * * * *